United States Patent
Kayhani et al.

(10) Patent No.: US 10,634,501 B2
(45) Date of Patent: Apr. 28, 2020

(54) DYNAMICALLY RESPONSIVE REAL-TIME POSITIONING FEEDBACK SYSTEM

(71) Applicant: Cubic Corporation, San Diego, CA (US)

(72) Inventors: Niosha Kayhani, Sutton (GB); Steffen Reymann, Guildford (GB); Angus Comber, London (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/421,766

(22) Filed: May 24, 2019

(65) Prior Publication Data

US 2019/0360812 A1   Nov. 28, 2019

Related U.S. Application Data

(60) Provisional application No. 62/675,915, filed on May 24, 2018.

(51) Int. Cl.

| | |
|---|---|
| *G01C 21/16* | (2006.01) |
| *G01C 21/20* | (2006.01) |
| *G08B 5/36* | (2006.01) |
| *G08B 3/00* | (2006.01) |
| *G07B 15/02* | (2011.01) |
| *G07C 9/00* | (2020.01) |

(52) U.S. Cl.
 CPC ........... *G01C 21/165* (2013.01); *G01C 21/20* (2013.01); *G08B 3/00* (2013.01); *G08B 5/36* (2013.01)

(58) Field of Classification Search
 CPC ........ G01C 21/165; G01C 21/20; G08B 5/36; G08B 3/00
 See application file for complete search history.

(56) References Cited

U.S. PATENT DOCUMENTS

| 10,054,446 B2* | 8/2018 | Cordova | H04W 4/029 |
|---|---|---|---|
| 10,132,635 B2* | 11/2018 | Kazemipur | G01C 21/165 |
| 10,192,242 B1* | 1/2019 | Duque de Souza | H04W 4/21 |

(Continued)

FOREIGN PATENT DOCUMENTS

EP   2991041 A2   3/2016

OTHER PUBLICATIONS

International Search Report and Written Opinion dated Sep. 16, 2019 in related foreign application No. PCT/US2019/033904, 17 pgs.

*Primary Examiner* — Frederick M Brushaber
(74) *Attorney, Agent, or Firm* — Kilpatrick Townsend & Stockton

(57) ABSTRACT

Systems, methods, and other techniques for providing dynamically responsive feedback to a transit user are disclosed. Location data regarding a plurality of locations of the transit user within a transit system may be detected by a tracking device. An intent to validate is received from the transit user. Based on the intent to validate, it is determined that a successful validation has occurred. Based on the location data, the plurality of locations are determined. Based on the plurality of locations, a location and a velocity of the transit user are determined. Instructions for a feedback signal are generated based on the location and the velocity. A feedback device positioned within the transit system is caused to output the feedback signal, indicating the successful validation.

20 Claims, 10 Drawing Sheets

(56) References Cited

U.S. PATENT DOCUMENTS

| | | | |
|---|---|---|---|
| 10,324,197 B1* | 6/2019 | Akpinar | G01S 19/49 |
| 2007/0273514 A1 | 11/2007 | Winand et al. | |
| 2014/0348013 A1* | 11/2014 | Terrenoir | G01S 5/0252 |
| | | | 370/252 |
| 2015/0120455 A1* | 4/2015 | McDevitt | G06Q 30/0261 |
| | | | 705/14.58 |
| 2015/0317853 A1* | 11/2015 | Reymann | G07C 9/00111 |
| | | | 340/5.7 |
| 2016/0042631 A1 | 2/2016 | Ho | |
| 2016/0069690 A1* | 3/2016 | Li | G01C 21/206 |
| | | | 701/412 |
| 2016/0373963 A1* | 12/2016 | Chechani | H04W 28/08 |
| 2017/0061715 A1* | 3/2017 | Busch-Sorensen | |
| | | | G07C 9/00111 |

* cited by examiner

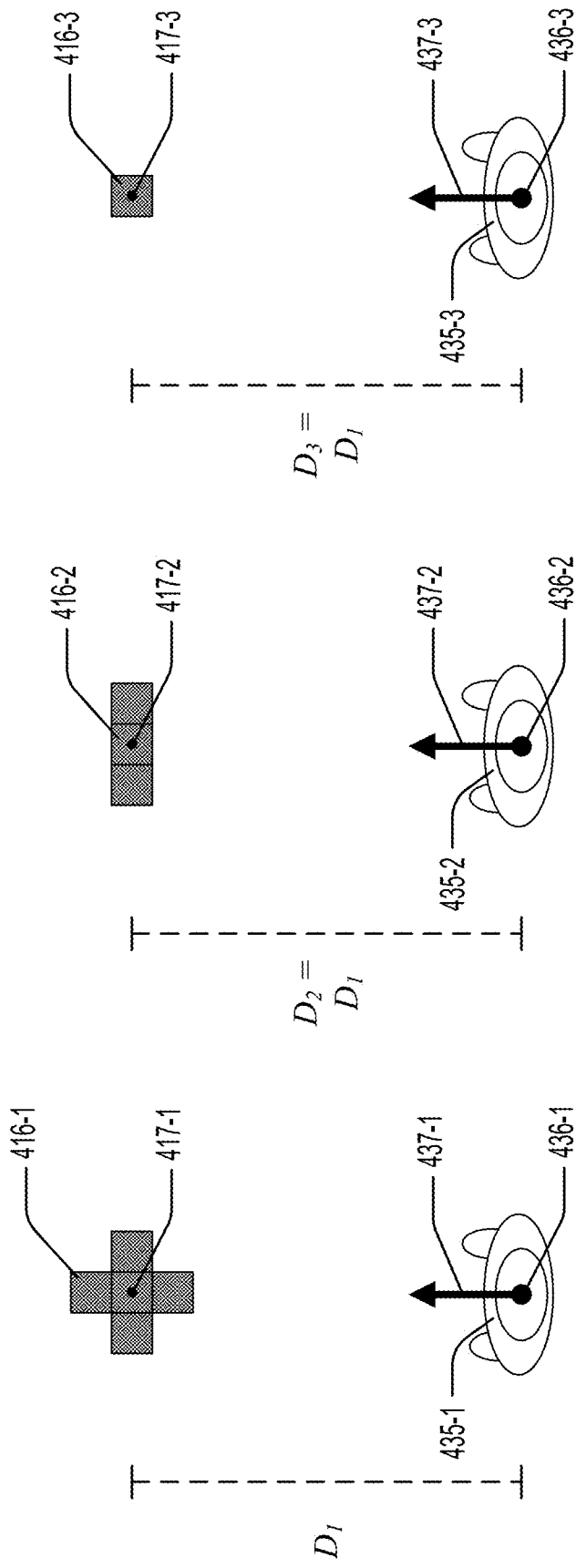

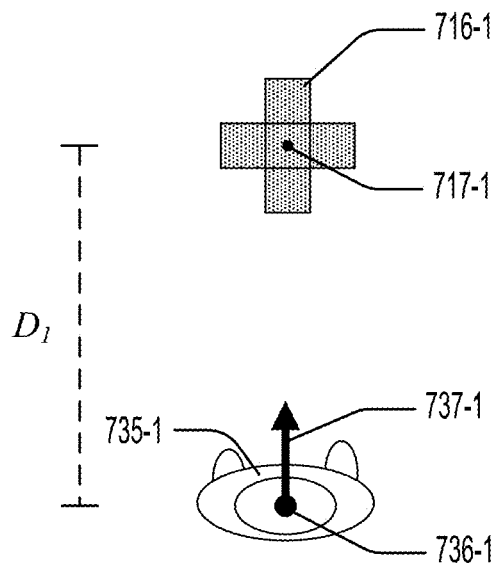
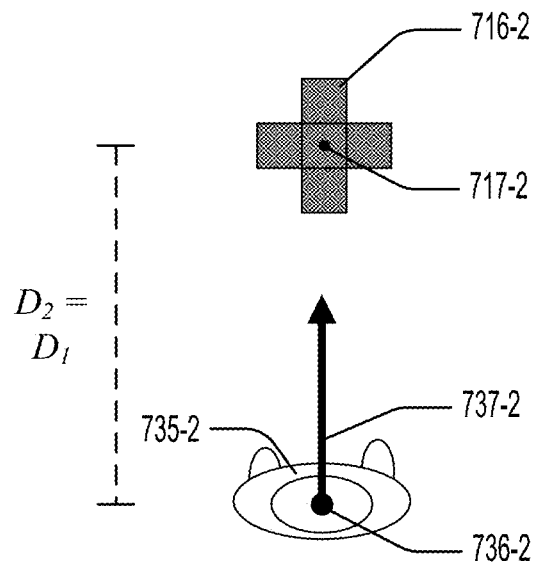
FIG. 7A  FIG. 7B
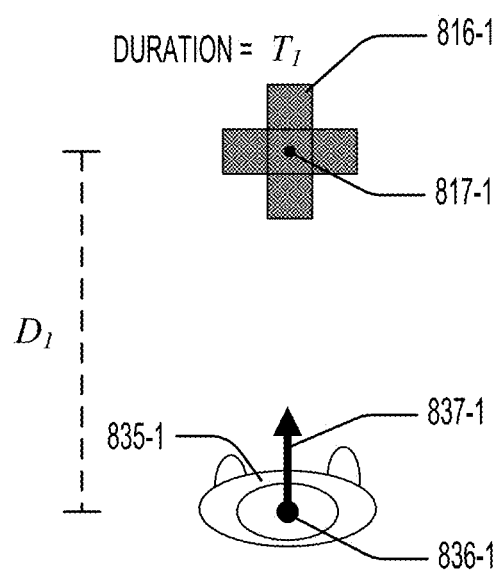
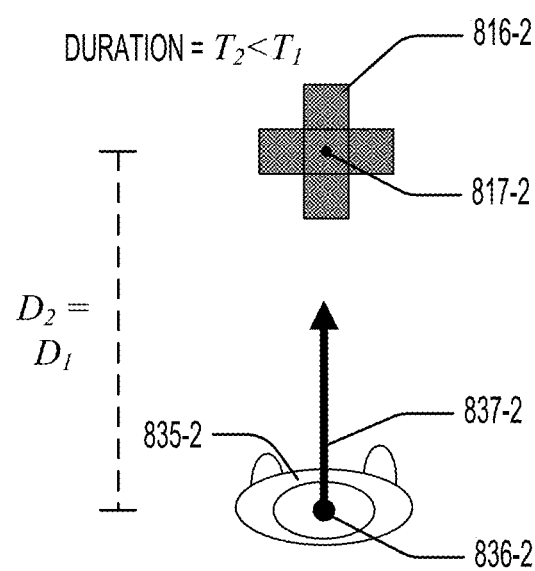
FIG. 8A  FIG. 8B

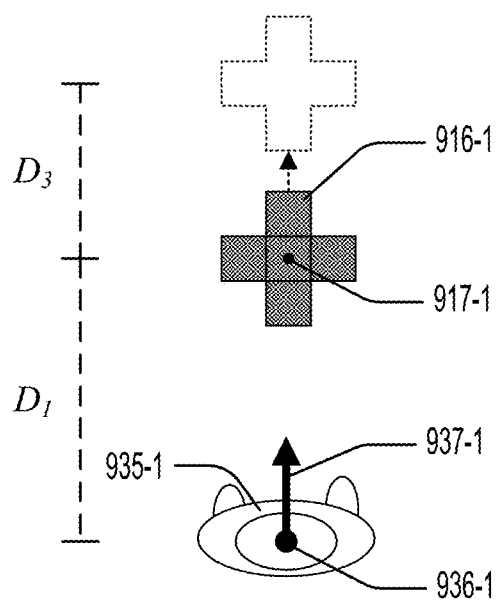
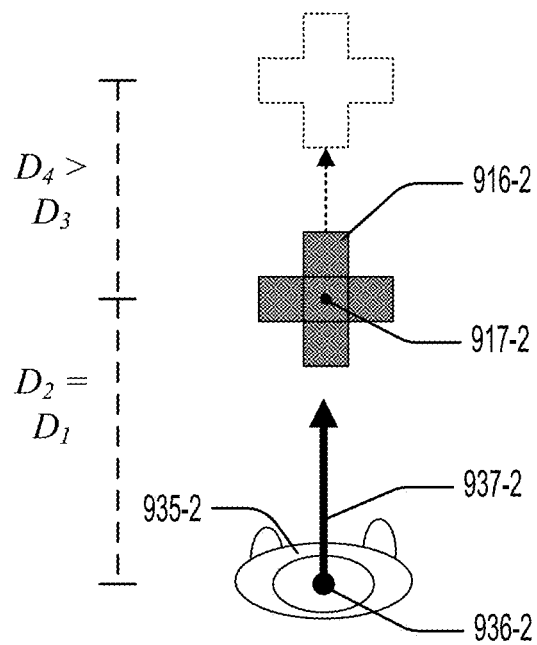
FIG. 9A          FIG. 9B
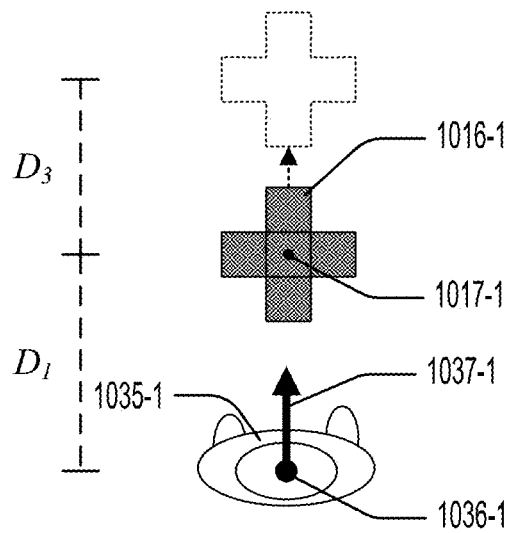
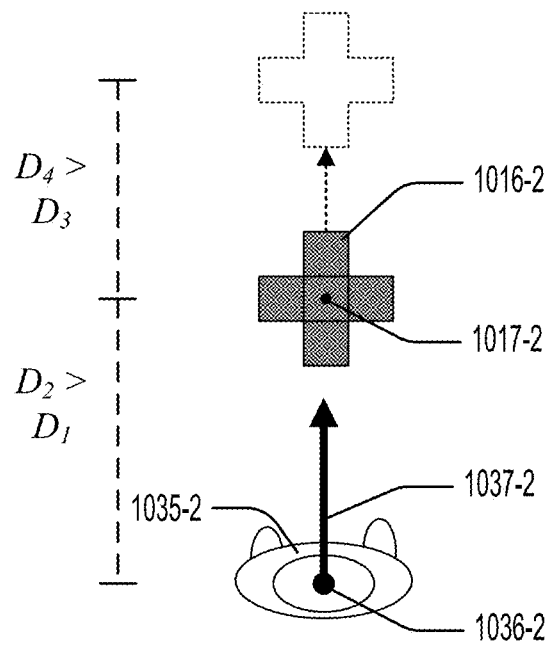
FIG. 10A          FIG. 10B

DYNAMICALLY RESPONSIVE REAL-TIME POSITIONING FEEDBACK SYSTEM

CROSS-REFERENCES TO RELATED APPLICATIONS

This application claims priority to U.S. Provisional Patent Application No. 62/675,915 filed May 24, 2018 titled "DYNAMICALLY RESPONSIVE REAL-TIME POSITIONING FEEDBACK SYSTEM (D2RP)," the entire disclosure of which is hereby incorporated by reference, for all purposes, as if fully set forth herein.

BACKGROUND OF THE INVENTION

As populations in the world's largest cities continue to grow, often at an exponential rate, public and private transportation systems are becoming increasingly burdened with increased ridership and transit stations are becoming increasingly congested, causing delays to transit users and increased costs to the transportation systems. The use of sophisticated electronic devices presents an appealing approach for managing such overcrowding. Unfortunately, existing devices and approaches are insufficient to alleviate these problems. Accordingly, new systems, methods, and other techniques are needed.

BRIEF SUMMARY OF THE INVENTION

A summary of the invention is provided below in reference to one or more examples. As used below, any reference to a series of examples is to be understood as a reference to each of those examples disjunctively (e.g., "Examples 1-4" is to be understood as "Examples 1, 2, 3, or 4").

Example 1 is a feedback system for providing dynamically responsive feedback to a transit user, the feedback system comprising: a feedback device positioned within the transit system and configured to output a feedback signal; a tracking device positioned within the transit system and configured to detect location data regarding a plurality of locations of the transit user within a transit system; a validator configured to: receive an intent to validate from the transit user; determine, based on the intent to validate, that a successful validation has occurred; and transmit an indication of the successful validation; a computer server comprising: one or more communication interfaces; a memory; and a processing unit communicatively coupled with the communication interface and the memory and configured to perform operations comprising: receiving, via one of the one or more communication interfaces, the location data from the tracking device; receiving, via one of the one or more communication interfaces, the indication of the successful validation; determining, based on the location data, the plurality of locations; determining, based on the plurality of locations, a location and a velocity of the transit user; generating instructions for the feedback signal based on the location and the velocity; and causing the feedback device to output the feedback signal, the feedback signal indicating the successful validation.

Example 2 is the feedback system of example(s) 1, wherein the feedback signal is velocity dependent such that either: a time for outputting the feedback signal is velocity dependent; a duration for outputting the feedback signal is velocity dependent; a position with respect to the transit user for outputting the feedback signal is velocity dependent; a magnitude of the feedback signal is velocity dependent; or a type of the feedback signal is velocity dependent.

Example 3 is the feedback system of example(s) 1, wherein the operations further comprise: in response to determining the location and the velocity, selecting the feedback device of a plurality of feedback devices based on the location and the velocity.

Example 4 is the feedback system of example(s) 1, wherein: the location is either a current location or a projected location; and the velocity is either a current velocity or a projected velocity.

Example 5 is the feedback system of example(s) 1, wherein causing the feedback device to output the feedback signal includes sending, via one of the one or more communication interfaces, the instructions for the feedback signal to the feedback device.

Example 6 is the feedback system of example(s) 1, wherein the feedback device is a speaker and the feedback signal is an audio feedback signal.

Example 7 is the feedback system of example(s) 1, wherein the feedback device is a light source and the feedback signal is a visual feedback signal.

Example 8 is a method for providing dynamically responsive feedback to a transit user, the method comprising: detecting location data regarding a plurality of locations of the transit user within a transit system; receiving an intent to validate from the transit user; determining, based on the intent to validate, that a successful validation has occurred; determining, based on the location data, the plurality of locations; determining, based on the plurality of locations, a location and a velocity of the transit user; generating instructions for a feedback signal based on the location and the velocity; and causing a feedback device positioned within the transit system to output the feedback signal, the feedback signal indicating the successful validation.

Example 9 is the method of example(s) 8, wherein the feedback signal is velocity dependent such that either: a time for outputting the feedback signal is velocity dependent; a duration for outputting the feedback signal is velocity dependent; a position with respect to the transit user for outputting the feedback signal is velocity dependent; a magnitude of the feedback signal is velocity dependent; or a type of the feedback signal is velocity dependent.

Example 10 is the method of example(s) 8, further comprising: in response to determining the location and the velocity, selecting the feedback device of a plurality of feedback devices based on the location and the velocity.

Example 11 is the method of example(s) 8, wherein: the location is either a current location or a projected location; and the velocity is either a current velocity or a projected velocity.

Example 12 is the method of example(s) 8, wherein causing the feedback device to output the feedback signal includes sending, via one of the one or more communication interfaces, the instructions for the feedback signal to the feedback device.

Example 13 is the method of example(s) 8, wherein the feedback device is a speaker and the feedback signal is an audio feedback signal.

Example 14 is the method of example(s) 8, wherein the feedback device is a light source and the feedback signal is a visual feedback signal.

Example 15 is a non-transitory computer-readable medium comprising instructions that, when executed by a processor, cause the processor to perform operations comprising: detecting location data regarding a plurality of locations of a transit user within a transit system; receiving an intent to validate from the transit user; determining, based on the intent to validate, that a successful validation has occurred; determining, based on the location data, the plurality of locations; determining, based on the plurality of locations, a location and a velocity of the transit user; generating instructions for a feedback signal based on the location and the velocity; and causing a feedback device positioned within the transit system to output the feedback signal, the feedback signal indicating the successful validation.

Example 16 is the non-transitory computer-readable medium of example(s) 15, wherein the feedback signal is velocity dependent such that either: a time for outputting the feedback signal is velocity dependent; a duration for outputting the feedback signal is velocity dependent; a position with respect to the transit user for outputting the feedback signal is velocity dependent; a magnitude of the feedback signal is velocity dependent; or a type of the feedback signal is velocity dependent.

Example 17 is the non-transitory computer-readable medium of example(s) 15, wherein the operations comprise: in response to determining the location and the velocity, selecting the feedback device of a plurality of feedback devices based on the location and the velocity.

Example 18 is the non-transitory computer-readable medium of example(s) 15, wherein: the location is either a current location or a projected location; and the velocity is either a current velocity or a projected velocity.

Example 19 is the non-transitory computer-readable medium of example(s) 15, wherein causing the feedback device to output the feedback signal includes sending, via one of the one or more communication interfaces, the instructions for the feedback signal to the feedback device.

Example 20 is the non-transitory computer-readable medium of example(s) 15, wherein the feedback device is a speaker and the feedback signal is an audio feedback signal.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIGS. 4A-4C illustrate different feedback signals that may be outputted by a feedback device.

FIGS. 7A and 7B illustrate examples of velocity-dependent feedback signals.

FIGS. 8A and 8B illustrate examples of velocity-dependent feedback signals.

FIGS. 9A and 9B illustrate examples of velocity-dependent feedback signals.

FIGS. 10A and 10B illustrate examples of velocity-dependent feedback signals.

Figure 1:
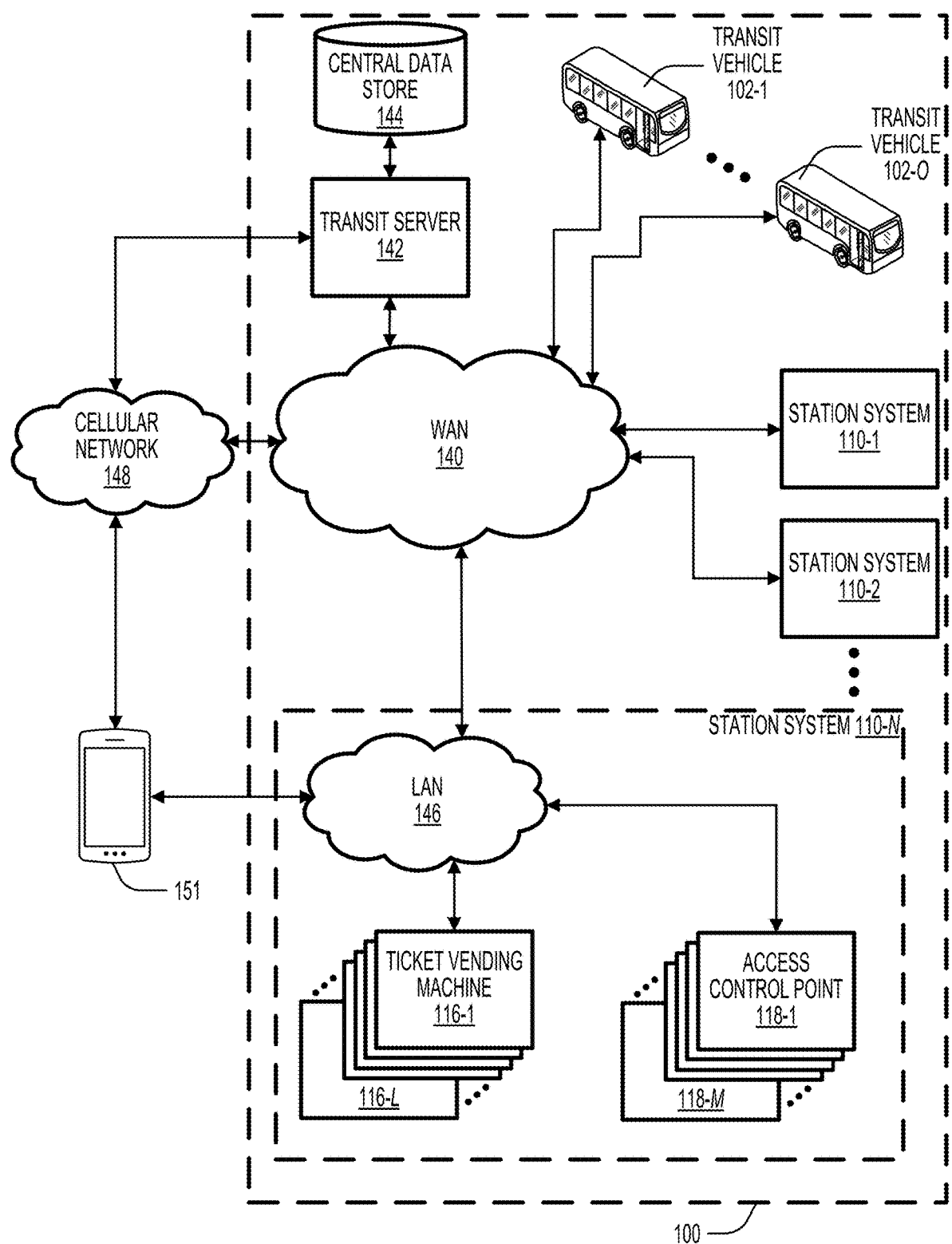
FIG. 1 illustrates a block diagram of transit system.

In the appended figures, similar components and/or features may have the same numerical reference label. Further, various components of the same type may be distinguished by following the reference label by a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the present invention are generally related to providing feedback to transit users in a transit system. A person of ordinary skill in the art will understand that alternative embodiments may vary from the embodiments discussed herein, and alternative applications may exist. For instance, embodiments may apply to large venues such as stadiums, theaters, museums, etc. Aspects of the invention disclosed herein may be applicable to payment systems and/or queue systems as well.

Fare collection for public and private transportation systems generally requires that the transit user purchase a ticket prior to entry into the transportation system, followed by the user presenting the purchased ticket at the gate, e.g., either to a machine or transit personnel. As transportation systems become burdened with increased ridership and ticketing gates become increasingly congested, it can become more difficult to provide individualized feedback to a transit user. Traditional techniques of providing feedback to passengers may involve video or audio prompts to individual users. There is currently no mechanism for accurately providing individualized feedback to a number of transit users whilst they are moving.

Techniques described herein address the issues above and other concerns by providing a dynamically responsive real-time positioning feedback system that can give individualized feedback to transit users. According to some embodiments, the feedback system may obtain coordinates of transit users moving indoors or outdoors in real time. According to some embodiments, a transit user's coordinates and/or motion can then be utilized to adapt a novel feedback system, providing the transit user with feedback regarding whether successful validation has occurred and/or feedback regarding how to navigate through the transit system.

As used herein, a transit user may validate by authenticating an intent to travel within the transit system. In some examples, a transit user may validate using a portable electronic device while entering a transit station by submitting a validation request (e.g., an intent to validate) from the portable electronic device to a validator via a cellular network, a local-area network, or a wide-area network. The validation request may be submitted using a transit application installed on the portable electronic device. In such examples, the validator may be positioned within or external to the transit station. In some examples, a transit user may validate using a digital or printed fare media (e.g., a paper ticket) by scanning the fare media at a validator positioned within the transit station (e.g., at an entrance to the transit station). In some examples, a transit user may validate by purchasing a transit product (e.g., a paper ticket) at a ticket vending machine (which may be considered a validator) positioned within the transit station.

In each of these examples, a transit user communicates an intent to validate to a validator. The intent to validate may optionally be sent anonymously such that the transit system does not know the identity of the transit user sending the intent to validate, only the location of the transit user within the transit station. Such anonymity is appealing to many transit users who may prefer to only use transit systems where anonymous validation is available.

In response to receiving the intent to validate from the transit user, the transit system (e.g., the validator) may determine whether a successful validation has occurred. In some examples, this may include receiving confirmation that a pending financial transaction has completed. For example, the transit system (e.g., the validator) may receive a confirmation that an account associated with the transit user contains sufficient funds to travel within the transit system. As another example, the transit system (e.g., the validator) may receive a confirmation that a withdrawal from an account associated with the transit user has completed or has been initiated. As another example, the transit system (e.g., the validator) may receive a confirmation that contact with an account associated with the transit user has been established. In some examples, determining that a successful validation has occurred may include verifying that a correct transit product has been dispensed by a ticket vending machine, or whether a digital or printed fare media has been properly scanned by a validator positioned within a transit station. Other possibilities are contemplated.

The feedback system can provide feedback signals through audio and/or visual feedback devices (e.g., displays, speakers, etc.) found throughout locations within the transit system. Moreover, feedback may not only provide a transit user with information regarding whether validation was successful, but may additionally or alternatively include other types of information, such as train status/location, account balance, and/or other information.

As described in additional the detail below, embodiments of the feedback system can change not only where and what it outputs as feedback based on real-time tracking, but also change how it gives feedback based on real-time demand on e.g., capacity of users. Certain forms of feedback (visual or audio) may be unsuitable when there is a high-density of users walking through the system so the system can recognize this and switch the way it provides feedback. Similarly when demand is less, the system can revert to providing a different form of feedback that most effectively targets the transit user for which the feedback is intended.

Embodiments of the feedback system may take into account the movement of other transit uses (or other people or objects) near the transit users for which the transit system is looking to give feedback. Additionally or alternatively, the feedback system can take into account the speed and density of people to determine when (distance and timing) and how (changing the feedback mechanism, turning it on/off, making it shorter/longer etc.) it should provide feedback.

Most high-fidelity positioning systems use mathematical models based upon trilateration (distance from markers), triangulation (angle to markers), as well as dead reckoning (calculating one's current position by using a previous position and advancing that position based upon known or estimated speeds over elapsed time and course using a mobile device gyroscope and compass such as those embedded in most smart phones). Embodiments of the feedback system can utilize available data and leverage it using data from 3D overhead tracking and/or other systems to trigger a feedback system designed to provide individualized feedback to the person as they physically move from two distinct points in space.

The feedback system can provide any of a variety of advantages, including one or more of the following. Embodiments may utilize speed, direction, and/or height of passengers as determined through an overhead tracking system and determine one or more specific areas to provide feedback for that individual. In embodiments where feedback is substantially in "real-time," embodiments may utilize coordinates to give feedback through horizontal and vertical planes. Dynamic feedback may be based on external triggers such as demand (changing specific lane feedback to generic feedback e.g., when too many people are traveling through a feedback zone).

Additional details follow below. The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

FIG. 1 illustrates a block diagram of transit system 100, according to some embodiments of the present invention. Transit system 100 can include various forms of transit, including subway, bus, ferry, commuter rail, para-transit, etc., or any combination thereof. Transit system 100 may include a plurality of station systems 110 located at a plurality of transit locations (or simply "locations") within transit system 100. While station systems 110 are generally considered to be fixed at transit locations, transit vehicles 102 move along predetermined routes often between different transit locations. For example, a transit user may begin a trip within transit system 100 at one of station systems 110 and may travel within one of transit vehicles 102 to another of station systems 110. Examples of transit vehicles 102 may include a train, a bus, a ferry, a plane, among other possibilities. Transit system 100 achieves interconnectivity between station systems 110, transit vehicles 102, and a transit server 142 via a wide-area network (WAN) 140, which may include one or more wired and/or wireless connections. Devices within each of station systems 110 are locally interconnected via a local-area network (LAN) 142, which may include one or more wired and/or wireless connections. Data used by transit server 142 in connection with operation of transit system 100 may be stored in a central data store 144 communicatively coupled to transit server 142.

Each of the transit locations may include a non-restricted access area and a restricted access area. The non-restricted access area may include areas that are freely accessible to the general public, whereas the restricted access area may be reserved exclusively for customers of transit system 100. Examples of a restricted access area may include: the inside of transit vehicles 102, a bus or train platform, the inside of a bus or train station, and the like. Each of station systems 110 may include various transit machines such as ticket vending machines 116 and access control points 118. Typically, each of ticket vending machines 116 is configured to allow a transit user to purchase a transit product such as a train or bus ticket and each of access control points 118 corresponds to a location where a transit product is to be presented or is required to be in the transit user's possession. In some embodiments, each of access control points 118 includes an entry point to transit system 100 that defines a passageway and separates the non-restricted access area from the restricted access area. Examples of access control points 118 include a gate, a turnstile, a platform validator, an entrance/exit to transit vehicles 102, among other possibilities. Each of ticket vending machines 116 and access control points 118 may be communicatively coupled to LAN 146 via one or more wired and/or wireless connections.

In some embodiments, transit users may create and maintain a transit user account. The transit user account can comprise information regarding the transit user, such as a name, address, phone number, email address, user identification (such as a unique identifier of the user or other user ID), passcode (such as a password and/or personal identification number (PIN)), an identification code associated with a fare media used to identify a transit user and/or a transit user account, information regarding user preferences and user opt-in or opt-out selections for various services, product(s) associated with the transit user account, a value and/or credit associated with the product(s), information regarding a funding source for the transit user account, among other possibilities. A transit user may request a transit user account and provide the information listed above by phone (such as a call to a customer service center maintained and/or provided by transit system 100), on the Internet, at one of ticket vending machines 116, or by other means. Transit server 142 can use the information provided by the user to create the transit user account, which can be stored and/or maintained on a database, such as central data store 144.

In some embodiments, a funding source can be linked to a transit user account to provide funding to purchase transit products. The funding source can be external to transit system 100 and can be maintained by a financial institution. Such a funding source may include a savings or checking account, a prepaid account, a credit account, an e-commerce account (such as a PAYPAL® account), or more, which can transfer funds via automated clearing house (ACH) or other means. If a transit user account comprises information regarding a funding source, transit server 142 can use the information to fund purchases or other transactions of a transit user. These transactions can be made at station systems 110, transit vehicles 102, on the Internet, by phone, text, email, or a variety of other different ways, and transaction information can then be sent to transit server 142 to update the transit user account associated with the transactions and reconcile payments and purchases with the funding source. The transit server 142 can communicate with the financial institution (or other entity maintaining the funding source) through a financial network (not shown).

A transit user may interact with transit system 100 using a portable electronic device 151 communicatively coupled with various components of transit system 100. Portable electronic device 151 may be a smart phone or other mobile phone (including a near-field-communication (NFC)-enabled mobile phone), a tablet personal computer (PC), a personal digital assistant (PDA), an e-book reader, or other device. A communicative link from portable electronic device 150 to transit server 142 can be provided by a cellular network 148 in communication with WAN 140 or in direct communication with transit server 142. Portable electronic device 151 can thereby access and/or manage information of a transit user account. Furthermore, transit server 142 can send messages to portable electronic device 151 providing transit, account, and/or advertisement information to the transit user in possession of portable electronic device 151. Such messages may be based on, among other things, opt-in or opt-out selections and/or other user preferences as stored in a transit user account. A transit user can use portable electronic device 151 to download a transit application from transit server 142 or from a mobile application source. The mobile application source may be an application store or website provided by a mobile carrier or the hardware and/or software provider of portable electronic device 151.

Figure 2:
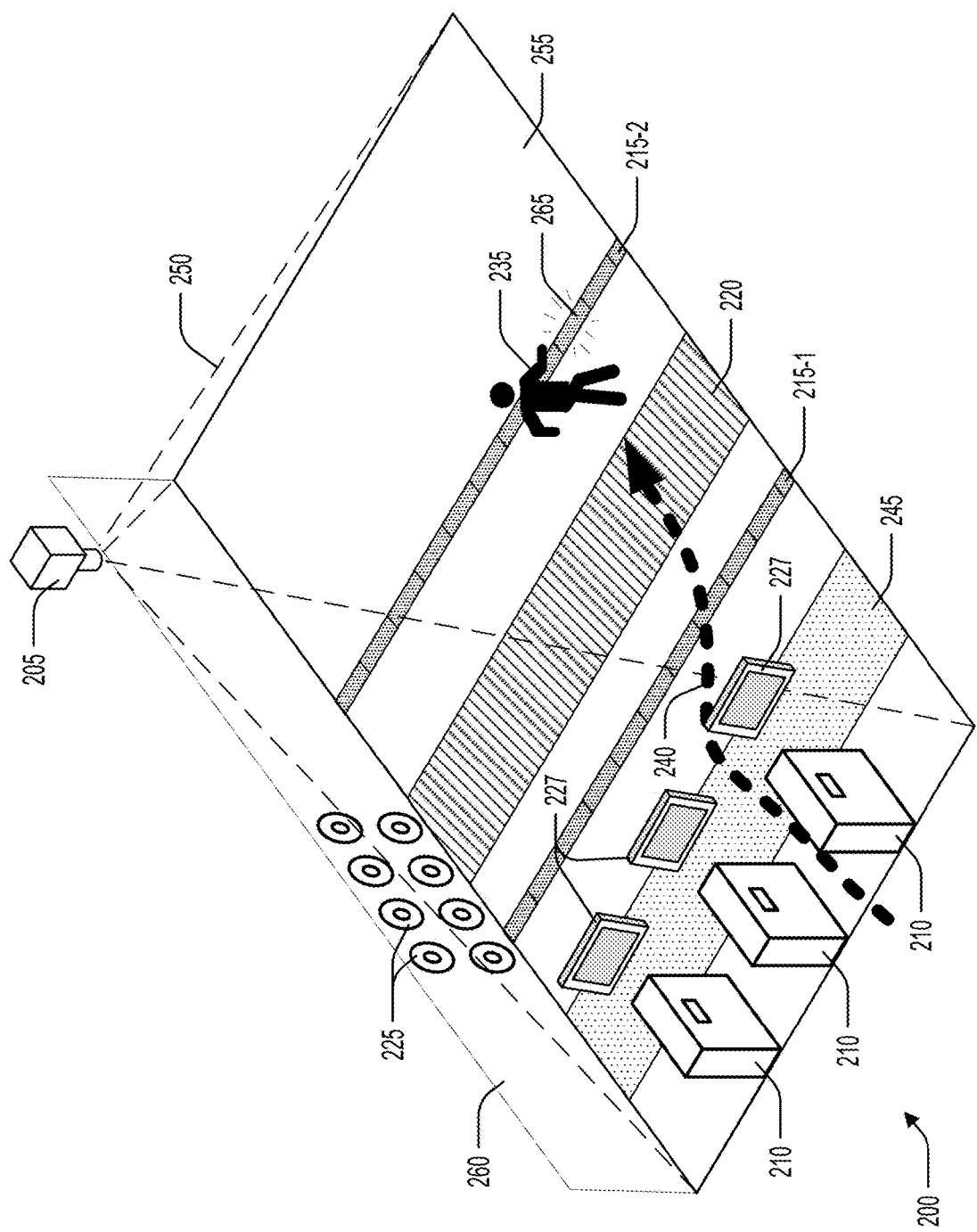
FIG. 2 illustrates a diagram of a feedback system implemented within a transit station of a transit system.

FIG. 2 illustrates an example of a feedback system 200 implemented within a transit station of a transit system, according to some embodiments of the present invention. Feedback system 200 comprises one or more tracking devices 205 (shown as a camera having a field of view 250 covering at least part of a floor 255 of the transit station), one or more validators 210, and one or more feedback devices, including light strips 215, tactile feedback component 220, audio speakers 225, and displays 227. It will be appreciated that FIG. 2 is provided as an example. Alternative embodiments of feedback system 200 may have additional or alternative types of tracking devices, validators, and feedback devices. Alternative embodiments may additionally or alternatively include a larger or smaller amount of components than the amount illustrated in FIG. 2. It will be further appreciated that, although one transit user 235 is illustrated in FIG. 2, embodiments may be capable of tracking many transit users (e.g., dozens, hundreds, or more) traveling through a portion of a transit system.

Traditional transit systems may be capable of providing limited feedback at a validator, such as providing a sound, flashing a light, or moving a physical barrier, which can indicate whether or not validation was successful. However, because the location of a transit user is typically unknown to the transit system after the user has left the validator, feedback in traditional transit systems provide limited or no customization to the transit user beyond this initial feedback. Moreover, traditional transit systems are typically incapable of providing any customized feedback based on the user movement. That is, feedback will be the same regardless of whether a transit user is running or jogging through a transit system, for example.

In contrast, feedback system 200 can utilize data from a variety of input components to provide customized feedback to transit user 235 using one or more output components. Here, input components may include validators 210 and tracking devices 205. Depending on desired functionality, additional or alternative input sources may be used in feedback system 200.

Validators 210 can gather information from transit user 235 as the user validates a fare media used to pay for a ride or other transit service. The information gathered by a validator during validation and provided to a transit server can vary, depending on desired functionality, fare media type, and/or other factors. In some embodiments, validator 210 may simply provide the transit server with an indication of whether validation was successful or not. In other embodiments, validator 210 may provide additional information, which may be extracted from the fare media. For example, if the fare media comprises a smart card, validator 210 may be able to provide a user or account ID, destination and/or origin information, travel history information, an account balance, and/or other information provided by the smart card. Other types of fare media may provide additional or alternative information. To provide validation, validators 210 may be communicatively coupled with other components of feedback system 200 and/or transit system 100.

The functionality of tracking devices 205 may also vary. Although illustrated as a single overhead camera, tracking devices 205 may comprise one or more cameras, radio frequency (RF) sensors, infrared sensors, pressure (weight) sensors, microphones, and the like. As such, tracking devices 205 may be capable of providing location information regarding transit user 235 as the user moves along a path 240 within the transit station. In some embodiments, tracking devices 205 may be capable of providing a 2D location. In other embodiments, the tracking system may be capable of providing a 3D location (e.g., including the height of transit user 235). In some embodiments, tracking devices 205 may determine the location information of transit user 235 as the user moves through one or more validation zones 245 within the transit system. In some embodiments, tracking devices 205 may be capable of providing location information of transit user 235 at any point within the field of view (represented by dotted lines 250) of tracking devices 205. In some embodiments, tracking devices 205 may begin tracking transit user 235 upon transit user 235 traveling through validation zone 245.

In some embodiments, tracking devices 205 may provide more general information regarding the transit station, such as noise levels, traffic levels, etc. An example tracking system that utilizes a camera and/or RF identification (RFID) transceiver to track the location of a transit user is described in U.S. patent application Ser. No. 15/244,631, entitled "VISION-BASED FARE COLLECTION," which is incorporated by reference herein.

According to some embodiments, tracking devices 205 may detect transit user 235 (or other object moving through the transit system) and tag transit user 235 with a unique identifier, enabling tracking devices 205 (or feedback system 200) to identify transit user 235 and/or to distinguish transit user 235 from other transit users (not shown) as transit user 235 moves through the tracking device's field of view. Tracking devices 205 can provide feedback system 200 with location information of transit user 235 periodically (at a certain rate, such as every second, several times a second, etc.) and/or based on certain triggers (e.g., when transit user 235 reaches a certain point, passes through validation zone 245, etc.). Validators 210 may be within the field of view of tracking devices 205, enabling feedback system 200 to correlate the validation information obtained by validators 210 with tracking information provided by tracking devices 205, such that feedback system 200 is capable of determining both the validation and location information specific to transit user 235.

The location information obtained by tracking devices 205 may include time data. That is, tracking devices 205 may be capable of determining a time at which transit user 235 is at a certain location. As such, a velocity of transit user 235 may be determined (e.g. by tracking devices 205 and/or feedback system 200). As described in additional detail below, the velocity of transit user 235 may be used to provide customized feedback to transit user 235.

It can be noted that the functionality of tracking devices 205 described herein may be performed, to some degree, by feedback system 200. That is, in some embodiments, feedback system 200 may gather raw and/or refined sensor data and to be able to track transit user 235 through the transit station. In some embodiments, tracking devices 205 may comprise one or more computing devices capable of gathering the sensor data and providing the tracking information to feedback system 200. As such, the information provided by tracking devices 205 to feedback system 200 may vary (e.g., from raw sensor data to high-level location information), depending on desired functionality.

Feedback system 200 can gather information from validators 210 and tracking devices 205 to then customize what feedback to provide a user and how to provide it. As previously mentioned, the type of feedback provided and the way in which it is provided may be influenced by environmental factors (crowd size, noise, location of venue (e.g., indoors or outdoors), weather, etc.), user data (validation status, destination, account balance, etc.), user movement data (location, velocity, etc.), contextual data (time of day, day of week, etc.) and/or other information gathered from the information components of feedback system 200.

The way in which feedback system 200 can coordinate feedback can vary, depending on the types of feedback included in feedback system 200. As previously noted, feedback system 200 of FIG. 2 includes light strips 215, a tactile feedback component 220, speakers 225, and displays 227. Other embodiments may include additional or alternative feedback devices. It can be further noted that, although light strips 215 and tactile feedback component 220 are illustrated as being located on a floor 255, speakers 225 are located on a wall 260, and displays 227 are located overhead near validators 210, alternative embodiments may be configured differently.

One or more light strips 215 may be used to provide a simple visual feedback to transit user 235. For example, light strip 215 may display one color if validation was successful, and another color if validation was not successful. Alternatively, in some embodiments, it may light up if validation was successful and remain dark if validation was not successful (or vice versa). In some embodiments, feedback providing additional or alternative information may be possible. For example, light strip 215 may display different colors based on an account balance of transit user 235, departure time of a transit user's train, and the like. Light strips 215 may be segmented to enable different segments 265 to light up independently, which can allow for more individualized feedback. It can be noted that other types of lighting may be used to provide functionality similar to light strips 215 as described herein.

Feedback system 200 can use input data in any of a variety of ways to adjust the way in which light strips 215 are illuminated. For example, information regarding time of day or ambient lighting may cause feedback system 200 to adjust the brightness of segment 265 to light up. A velocity of transit user 235 may impact a duration of how long segment 265 is illuminated and/or which segment 265 to illuminate. In FIG. 2, for instance, transit user 235 may be moving relatively quickly, in which case feedback system 200 may choose to illuminate segment 265 on second light strip 215-1 rather than first light strip 215-1. The determination of which segment 265 to illuminate and when to illuminate it may be based on user velocity (speed and direction). Because transit user 235 is moving relatively quickly, feedback system 200 may illuminate segment 265 for a relatively short amount of time, compared with other users that may be moving more slowly. In some embodiments, feedback system 200 may have hardcoded limitations on the brightness and/or speed at which light strips 215 are illuminated, to help ensure that transit users with sensitivity to light flashes (e.g., users with photosensitive epilepsy) are not harmed.

Speakers 225 may provide audio feedback, according to some embodiments. For example, speakers 225 may provide a sound based on whether validation was successful, a verbal indication of the status of the transit users train (or other transit vehicle), etc. Volume may be adjusted based on environmental factors (e.g., noise) and/or contextual factors (e.g., time of day), for example. A particular speaker (or speakers) chosen to provide audio feedback to transit user 235 may be selected based on the location of the speaker (or speakers) relative to the location (or expected location) of transit user 235. In FIG. 2, speakers 225 are illustrated as being located on wall 260 to help illustrate how feedback system 200 may provide customized feedback based on a user's 3D location (including the user's height). Of course, alternative embodiments may utilize visual, tactile, or other feedback devices to provide feedback based on a user's 3D location in a similar manner. In alternative embodiments, speakers 225 may be located, for example, in floor 255, at or near validators 210, and/or elsewhere within feedback system 200.

Tactile feedback component 220 may be configured to provide tactile feedback (e.g., a vibration) to transit user 235. In some embodiments, tactile feedback component 220 may be segmented in a manner similar to light strips 215, enabling feedback system 200 to provide more individualized feedback. Although illustrated as a strip on floor 255 after transit user 235 passes validators 210, a tactile feedback component may be located elsewhere within feedback system 200.

Displays 227 may be used to provide more complex visual feedback then light strips 215. For example, displays 227 may indicate a departure location, departure time, status of a train (or other transit vehicle) for a destination of transit user 235 traveling through feedback system 200. Displays 227 may additionally or alternatively provide more generalized feedback, based on environmental factors and/or other non-individualized data. For example, if feedback system 200 determines that the system is too busy for individualized feedback, it may cause the displays 227 to show departure information for the most popular trains. Although capable of providing more complex visual feedback, displays 227 may additionally or alternatively provide feedback similar to light strips 215, providing lighting of different colors, brightness, and/or timing to indicate various types of feedback.

As previously noted, changes in environment may impact how feedback system 200 determines to provide feedback. For example, feedback system 200 may determine that individualized feedback may be unfeasible if the transit station reaches or exceeds a threshold amount of traffic. That is, feedback system 200 may receive data from tracking devices 205 indicating that a certain amount of people are traveling through the portion of the transit system in which feedback system 200 is located, and feedback system 200 may switch from providing individualized feedback to generalized feedback when the certain amount of people reaches or exceeds a certain threshold. In some embodiments, different feedback systems may have different thresholds. For example, feedback system 200 may stop providing individualized feedback via speakers 225 after the amount of people has exceeded a first threshold, but may continue providing individualized feedback via light strips 215 unless the amount of people exceeds a second threshold. Other such variations are contemplated.

In some embodiments, feedback system 200 may interact with a mobile phone or other portable electronic device carried by transit user 235. For instance, a mobile phone may communicate with tracking devices 205 (e.g., via RF signals) to help determine the location of transit user 235. Additionally or alternatively, a display and/or speakers of the mobile phone may be used to provide feedback to the transit user 235. For example, a mobile phone may execute a software application that enables feedback system 200 to communicate with the mobile phone to provide audio and/or visual feedback in a manner similar to other feedback components described herein.

Figure 3:
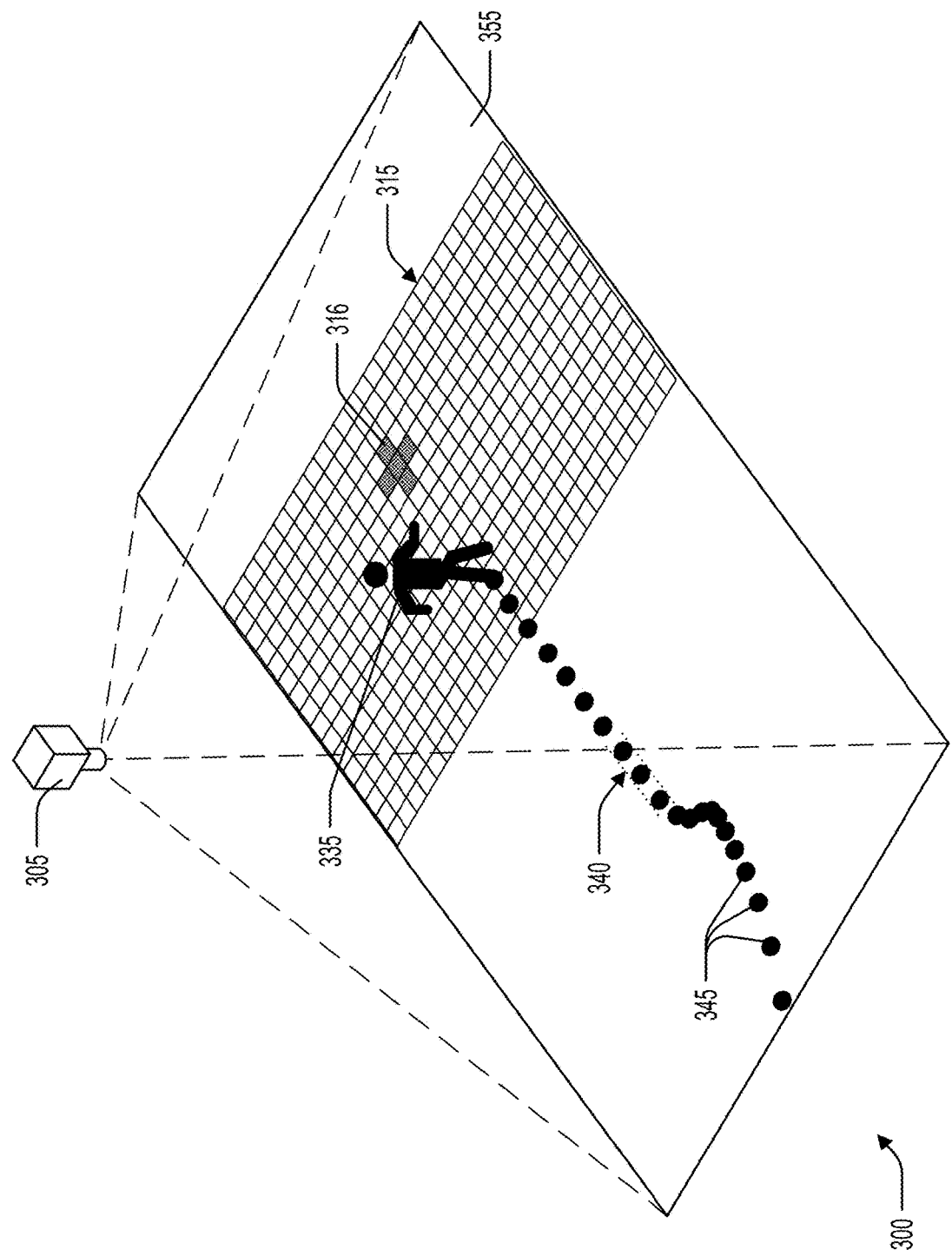
FIG. 3 illustrates a diagram of a feedback system implemented within a transit station of a transit system.

FIG. 3 illustrates an example of a feedback system 300 implemented within a transit station of a transit system, according to some embodiments of the present invention. One or more components of feedback system 300 may be similar to one or more components described in reference to feedback system 200. For example, feedback system 300 may include a tracking device 305, comprising an overhead camera, and a feedback device 315, comprising an array of floor lights positioned on a floor 355. Feedback device 315 may output a feedback signal 316 comprising a temporary illumination of one or more of the floor lights of feedback device 315.

In some embodiments, tracking device 305 may detect location data corresponding to a transit user 335. The location data may include a plurality of locations 345 of transit user 335, each of the locations corresponding to a 2D or 3D location where the tracking device 305 determines transit user 335 to be located. Each of locations 345 may be associated with a time stamp. Locations 345 may be analyzed to determine a path 340 of transit user 335. Locations 345 may be analyzed to determine a location and a velocity of transit user 335. Based on the determined location and velocity, feedback device 315 may cause feedback signal 316 to be outputted so as to be perceived by transit user 335. In the illustrated example, feedback signal 316 is caused to be outputted at a particular distance in front of transit user 335, allowing transit user 335 to see the illuminated floor lights in front of him/her.

FIGS. 4A-4C illustrate different feedback signals 416 that may be outputted by a feedback device, according to some embodiments of the present invention. In reference to FIG. 4A, a feedback system may determine that a first transit user 435-1 has a location 436-1 and a velocity 437-1. Based on position 436-1 and velocity 437-1, the feedback system may cause a first feedback signal 416-1 to be outputted at a relative position 417-1 with respect to first transit user 435-1 that is a distance $D_1$ from location 436-1. First feedback signal 416-1 may indicate that a successful validation has occurred.

In reference to FIG. 4B, the feedback system may determine that a second transit user 435-2 has a location 436-2 and a velocity 437-2. Based on position 436-2 and velocity 437-2, the feedback system may cause a second feedback signal 416-2 to be outputted at a relative position 417-2 with respect to second transit user 435-2 that is a distance $D_2$ from location 436-2. Because velocity 437-2 is equivalent to velocity 437-1, distance $D_2$ may be equivalent to distance $D_1$. Second feedback signal 416-2 may indicate that a successful validation has not occurred.

In reference to FIG. 4C, the feedback system may determine that a third transit user 435-3 has a location 436-3 and a velocity 437-3. Based on position 436-3 and velocity 437-3, the feedback system may cause a third feedback signal 416-3 to be outputted at a relative position 417-3 with respect to third transit user 435-3 that is a distance $D_3$ from location 436-3. Because velocity 437-3 is equivalent to velocity 437-1 (and likewise velocity 437-2), distance $D_3$ may be equivalent to distance $D_1$ (and likewise distance $D_3$). Third feedback signal 416-3 may indicate that the feedback system is still determining whether a successful validation has occurred (e.g., that the validation is pending). In some embodiments, feedback signals 416 may have an identical number of illuminated lights and may instead be differentiated based on brightness, color, duration, among other possibilities.

Figure 5A:
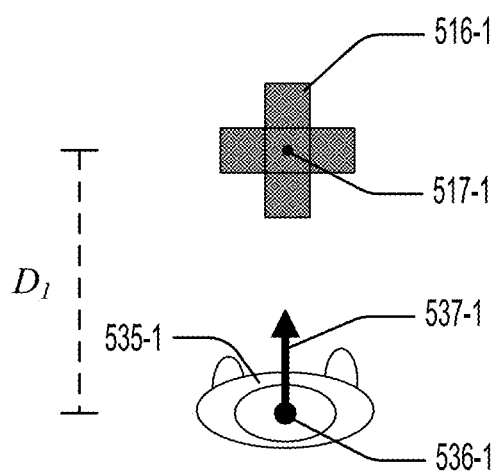
FIGS. 5A and 5B illustrate examples of velocity-dependent feedback signals.
Figure 5B:
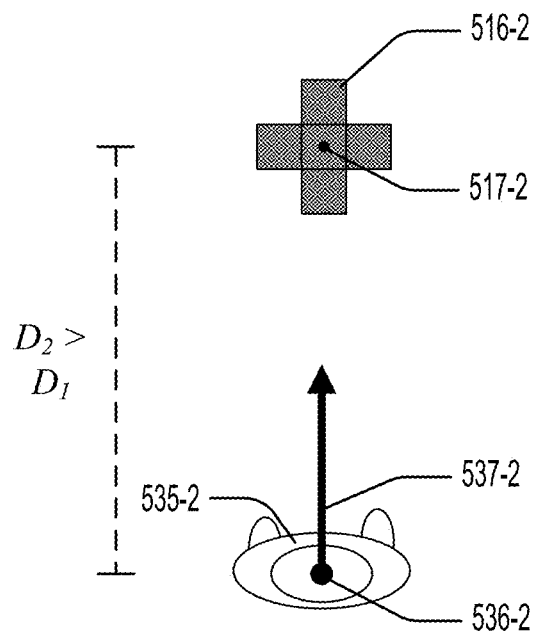

FIGS. 5A and 5B illustrate examples of velocity-dependent feedback signals 516 that may be outputted by a feedback device in response to a feedback system determining that a successful validation has occurred, according to some embodiments of the present invention. In the illustrated examples, the positions of the feedback signals are velocity dependent. FIGS. 5A and 5B may correspond to two different scenarios where a same transit user can have one of two different velocities while being located at a particular location while traveling through a transit station. In reference to FIG. 5A, the feedback system may determine that a first transit user 535-1 has a location 536-1 and a velocity 537-1, and may accordingly generate instructions causing the feedback device to output a first feedback signal 516-1 at a relative position 517-1 with respect to first transit user 535-1 that is a distance $D_1$ from position 536-1.

In FIG. 5B, the position of the feedback signal is modified compared to FIG. 5A. Specifically, the feedback system may determine that a second transit user 535-2 has a location 536-2 and a velocity 537-2, and may accordingly generate instructions causing the feedback device to output a second feedback signal 516-2 at a relative position 517-2 with respect to second transit user 535-2 that is a distance $D_2$ from position 536-2. Because velocity 537-2 is greater than velocity 537-1, distance $D_2$ is greater than distance $D_1$.

Figure 6A:
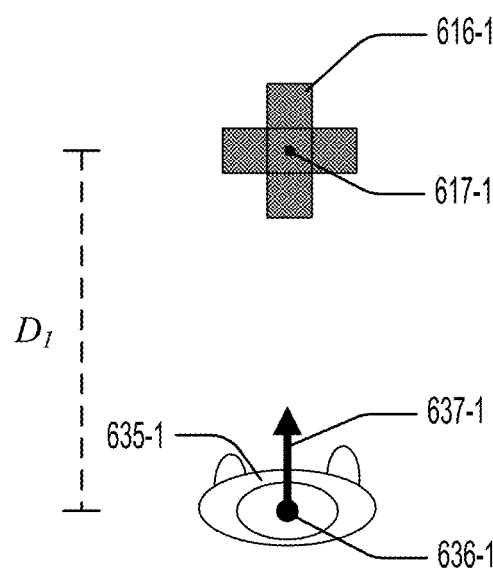
FIGS. 6A and 6B illustrate examples of velocity-dependent feedback signals.
Figure 6B:
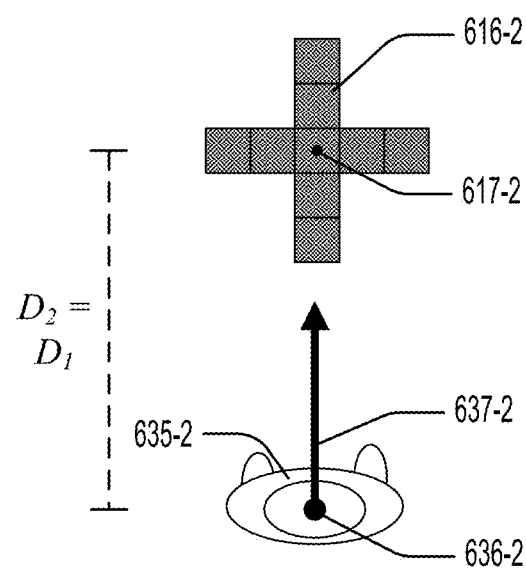

FIGS. 6A and 6B illustrate examples of velocity-dependent feedback signals 616 that may be outputted by a feedback device in response to a feedback system determining that a successful validation has occurred, according to some embodiments of the present invention. In the illustrated examples, the sizes (number of illuminated lights) of the feedback signals are velocity dependent. FIGS. 6A and 6B may correspond to two different scenarios where a same transit user can have one of two different velocities while being located at a particular location while traveling through a transit station. In reference to FIG. 6A, the feedback system may determine that a first transit user 635-1 has a location 636-1 and a velocity 637-1, and may accordingly generate instructions causing the feedback device to output a first feedback signal 616-1 at a relative position 617-1 with respect to first transit user 635-1 that is a distance $D_1$ from position 636-1.

In FIG. 6B, the size of the feedback signal is modified compared to FIG. 6A. Specifically, the feedback system may determine that a second transit user 635-2 has a location 636-2 and a velocity 637-2, and may accordingly generate instructions causing the feedback device to output a second feedback signal 616-2 at a relative position 617-2 with respect to second transit user 635-2 that is a distance $D_2$ from position 636-2, which is equivalent to distance $D_1$. Because velocity 537-2 is greater than velocity 537-1, second feedback signal 616-2 may include four additional illuminated lights compared to first feedback signal 616-1.

FIGS. 7A and 7B illustrate examples of velocity-dependent feedback signals 716 that may be outputted by a feedback device in response to a feedback system determining that a successful validation has occurred, according to some embodiments of the present invention. In the illustrated examples, the magnitudes (brightness of the illuminated lights) of the feedback signals are velocity dependent. FIGS. 7A and 7B may correspond to two different scenarios where a same transit user can have one of two different velocities while being located at a particular location while traveling through a transit station. In reference to FIG. 7A, the feedback system may determine that a first transit user 735-1 has a location 736-1 and a velocity 737-1, and may accordingly generate instructions causing the feedback device to output a first feedback signal 716-1 at a relative position 717-1 with respect to first transit user 735-1 that is a distance $D_1$ from position 736-1.

In FIG. 7B, the magnitude of the feedback signal is modified compared to FIG. 7A. Specifically, the feedback system may determine that a second transit user 735-2 has a location 736-2 and a velocity 737-2, and may accordingly generate instructions causing the feedback device to output a second feedback signal 716-2 at a relative position 717-2 with respect to second transit user 735-2 that is a distance $D_2$ from position 736-2, which is equivalent to distance $D_1$. Because velocity 737-2 is greater than velocity 737-1, second feedback signal 716-2 has a different magnitude (e.g., illuminated lights are brighter or dimmer) compared to first feedback signal 716-1.

FIGS. 8A and 8B illustrate examples of velocity-dependent feedback signals 816 that may be outputted by a feedback device in response to a feedback system determining that a successful validation has occurred, according to some embodiments of the present invention. In the illustrated examples, the durations of the feedback signals are velocity dependent. FIGS. 8A and 8B may correspond to two different scenarios where a same transit user can have one of two different velocities while being located at a particular location while traveling through a transit station. In reference to FIG. 8A, the feedback system may determine that a first transit user 835-1 has a location 836-1 and a velocity 837-1, and may accordingly generate instructions causing the feedback device to output a first feedback signal 816-1 for a duration $T_1$ at a relative position 817-1 with respect to first transit user 835-1 that is a distance $D_1$ from position 836-1.

In FIG. 8B, the duration of the feedback signal is modified compared to FIG. 8A. Specifically, the feedback system may determine that a second transit user 835-2 has a location 836-2 and a velocity 837-2, and may accordingly generate instructions causing the feedback device to output a second feedback signal 816-2 for a duration $T_2$ at a relative position 817-2 with respect to second transit user 835-2 that is a distance $D_2$ from position 836-2, which is equivalent to distance $D_1$. Because velocity 837-2 is greater than velocity 837-1, duration $T_2$ may be shorter than duration $T_1$. This can prevent confusion between different feedback signals, such that feedback signals do not persist beyond the time that a transit user travels past the position of the feedback signal.

FIGS. 9A and 9B illustrate examples of velocity-dependent feedback signals 916 that may be outputted by a feedback device in response to a feedback system determining that a successful validation has occurred, according to some embodiments of the present invention. In the illustrated examples, the movements of the feedback signals are velocity dependent. FIGS. 9A and 9B may correspond to two different scenarios where a same transit user can have one of two different velocities while being located at a particular location while traveling through a transit station. In reference to FIG. 9A, the feedback system may determine that a first transit user 935-1 has a location 936-1 and a velocity 937-1, and may accordingly generate instructions causing the feedback device to output a first feedback signal 916-1 at a relative position 917-1 with respect to first transit user 935-1 that is a distance $D_1$ from position 936-1. The generated instructions may further cause first feedback signal 916-1 to move over a distance $D_3$. Distance $D_3$ may be dependent on velocity 937-1 while distance $D_1$ may not be dependent on the transit user's velocity.

In FIG. 9B, the movement of the feedback signal is modified compared to FIG. 9A. Specifically, the feedback system may determine that a second transit user 935-2 has a location 936-2 and a velocity 937-2, and may accordingly generate instructions causing the feedback device to output a second feedback signal 916-2 at a relative position 917-2 with respect to second transit user 935-2 that is a distance $D_2$ from position 936-2, which is equivalent to distance $D_1$. The generated instructions may further cause second feedback signal 916-2 to move over a distance $D_4$. Because velocity 937-2 is greater than velocity 937-1, distance $D_4$ may be greater than $D_3$.

FIGS. 10A and 10B illustrate examples of velocity-dependent feedback signals 1016 that may be outputted by a feedback device in response to a feedback system determining that a successful validation has occurred, according to some embodiments of the present invention. In the illustrated examples, the positions and the movements of the feedback signals are velocity dependent. FIGS. 10A and 10B may correspond to two different scenarios where a same transit user can have one of two different velocities while being located at a particular location while traveling through a transit station. In reference to FIG. 10A, the feedback system may determine that a first transit user 1035-1 has a location 1036-1 and a velocity 1037-1, and may accordingly generate instructions causing the feedback device to output a first feedback signal 1016-1 at a relative position 1017-1 with respect to first transit user 1035-1 that is a distance $D_1$ from position 1036-1. The generated instructions may further cause first feedback signal 1016-1 to move over a distance $D_3$. Both distances $D_1$ and $D_3$ may be dependent on velocity 1037-1.

In FIG. 10B, the position and the movement of the feedback signal is modified compared to FIG. 10A. Specifically, the feedback system may determine that a second transit user 1035-2 has a location 1036-2 and a velocity 1037-2, and may accordingly generate instructions causing the feedback device to output a second feedback signal 1016-2 at a relative position 1017-2 with respect to second transit user 1035-2 that is a distance $D_2$ from position 1036-2. The generated instructions may further cause second feedback signal 1016-2 to move over a distance $D_4$. Because velocity 1037-2 is greater than velocity 1037-1, distance $D_4$ may be greater than $D_3$ and distance $D_2$ may be greater than $D_1$.

Figure 11:
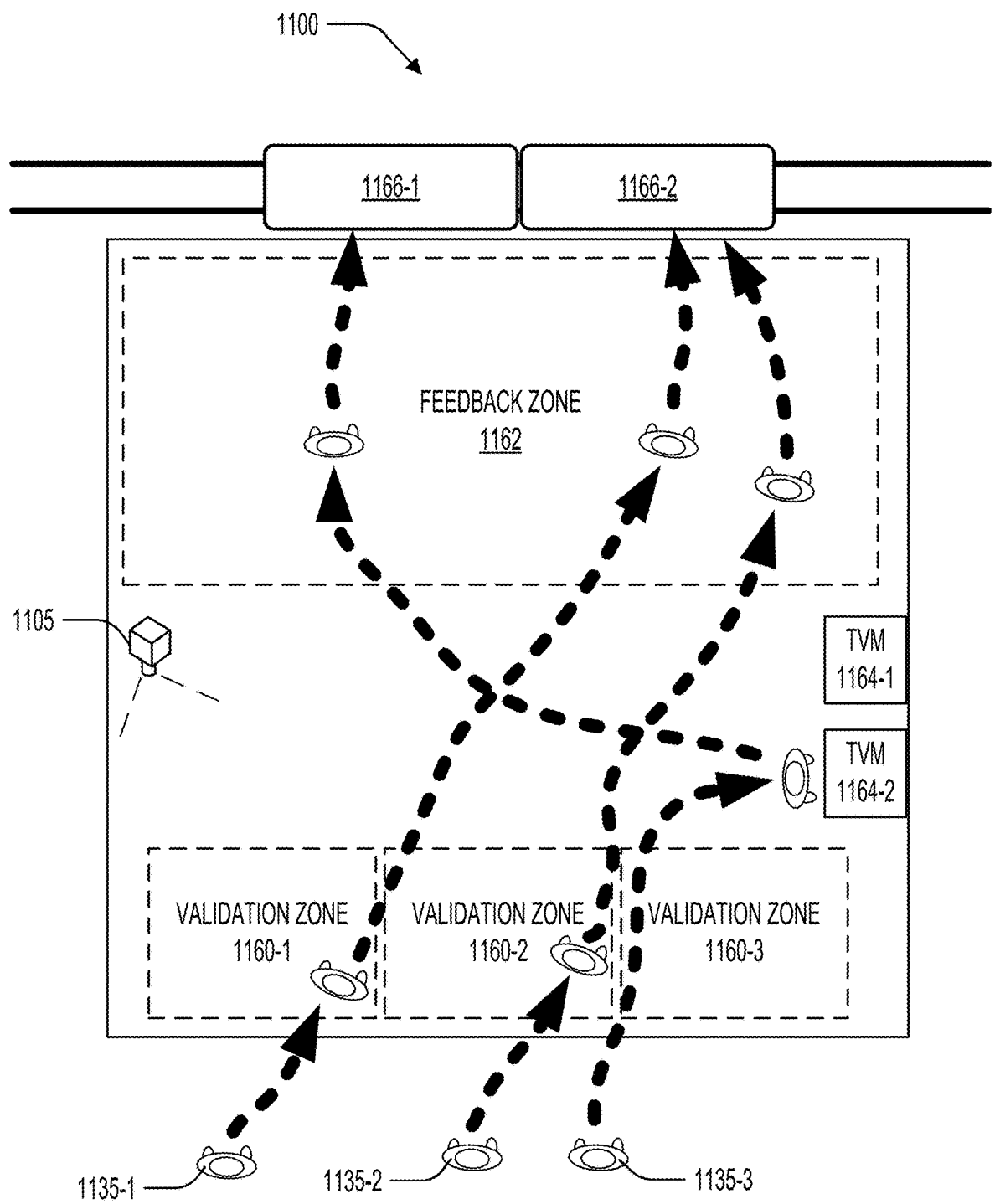
FIG. 11 illustrates a diagram of a feedback system implemented within a transit station of a transit system.

FIG. 11 illustrates an example of a feedback system 1100 implemented within a transit station of a transit system, according to some embodiments of the present invention. In the illustrated example, one or more transit vehicles 1166 (e.g., trains) may transport passengers to/from the transit station. Feedback system 1100 may include multiple validation zones 1160 that transit users may travel through within the transit station. In one example, a first transit user 1135-1 enters validation zone 1160-1 and sends, using a portable electronic device while within validation zone 1160-1, an intent to validate to feedback system 1100. The intent to validate may be accompanied by an indication of validation zone 1160-1 so that feedback system 1100 may associate the received intent to validate with the person being tracked. For example, using a transit application, first transit user 1135-1 may check a box indicating validation zone 1160-1. In some examples, feedback system 1100 may determine, based on a position of the validator that received the intent to validate, that the received intent to validate is associated with a transit user currently located in validation zone 1160-1. For example, a validator may be positioned within validation zone 1160-1. If the intent to validate is received by multiple validators located in multiple validation zones 1160, the different validators may compare the received signal strengths to determine which validation zone the transit user is currently located in.

Prior to exiting validation zone 1160-1, tracking device 1105 may begin tracking first transit user 1135-1. First transit user 1135-1 may then exit validation zone 1160-1 while feedback system 1100 is attempting to determine whether successful validation has occurred. First transit user 1135-1 may then enter feedback zone 1162. Prior to first transit user 1135-1 boarding transit vehicle 1166-2 and while within feedback zone 1162, feedback system 1100 may provide first transit user 1135-1 with feedback by causing a feedback device to output a feedback signal indicating successful validation, as described herein. If first transit user 1135-1 receives no such feedback, he/she may wait within feedback zone 1162 to receive feedback or may return to one of validation zones 1160 to resend a second intent to validate.

At the same time that first transit user 1135-1 sends an intent to validate within validation zone 1160-1, a second transit user 1135-2 enters validation zone 1160-2 and sends, using a portable electronic device while within validation zone 1160-2, an intent to validate to feedback system 1100. The intent to validate sent by second transit user 1135-2 may be accompanied by an indication of validation zone 1160-2 so that feedback system 1100 may associate the first received intent to validate with first transit person 1135-1 and the second received intent to validate with second transit person 1135-2. Prior to second transit user 1135-2 boarding transit vehicle 1166-2 and while within feedback zone 1162, feedback system 1100 may provide second transit user 1135-2 with feedback by causing a feedback device to output a feedback signal indicating successful validation, as described herein.

A third transit user 1135-3 may send an intent to validate using a ticket vending machine 1164-2. For example, third transit user 1135-3 may purchase a transit product, thereby sending an intent to validate to feedback system 1100. Prior to leaving ticket vending machine 1164-2, tracking device 1105 may begin tracking third transit user 1135-3. Third transit user 1135-3 may then enter feedback zone 1162. Prior to third transit user 1135-3 boarding transit vehicle 1166-1 and while within feedback zone 1162, feedback system 1100 may provide third transit user 1135-3 with feedback by causing a feedback device to output a feedback signal indicating successful validation, as described herein.

Figure 12:
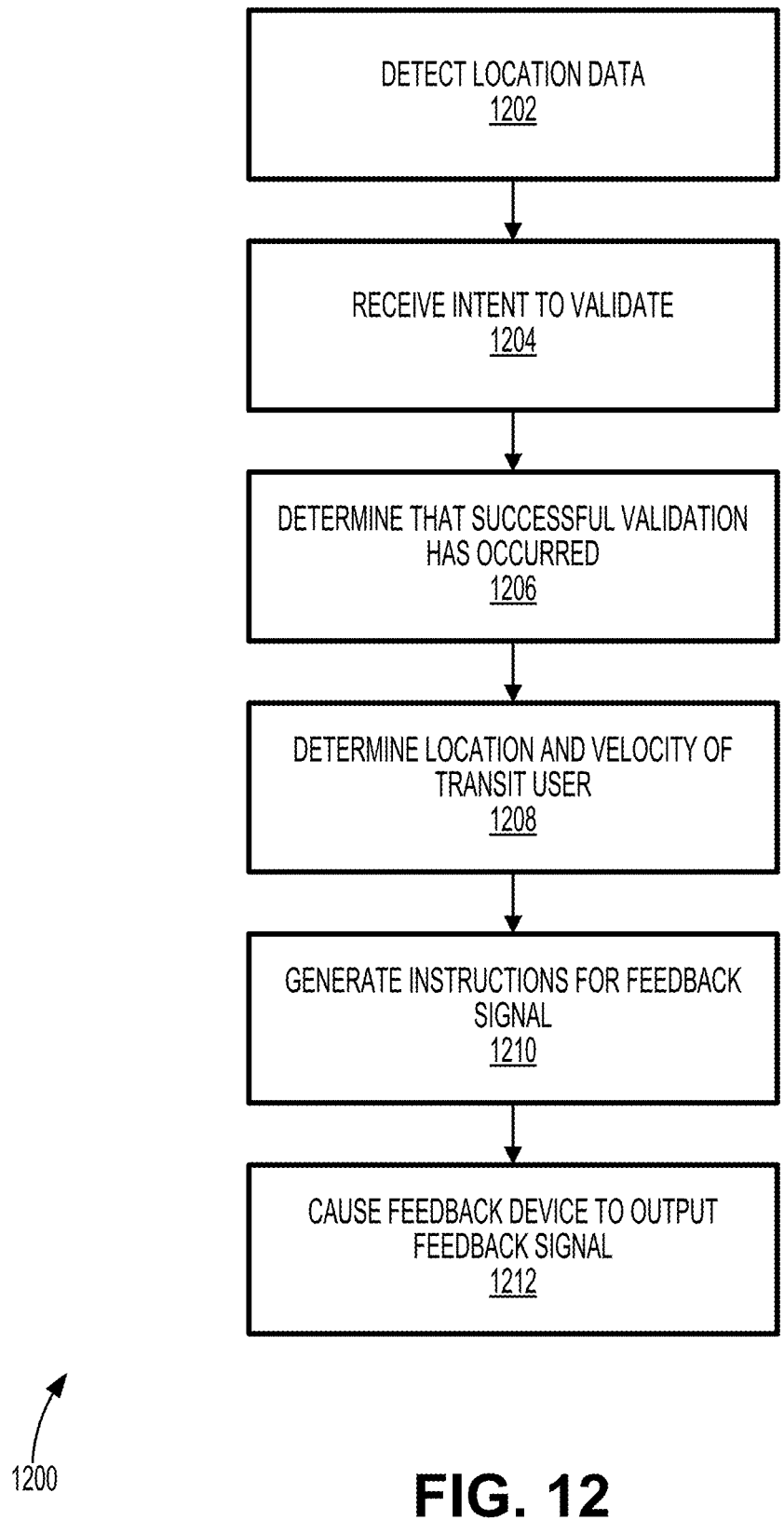
FIG. 12 illustrates a method for providing dynamically responsive feedback to a transit user.

FIG. 12 illustrates a method 1200 for providing dynamically responsive feedback to a transit user, according to some embodiments of the present invention. One or more steps of method 1200 may be performed by components of a feedback system. One or more steps of method 1200 may be performed in an order different than the illustrated embodiment, and one or more steps of method 1200 may be omitted during performance of method 1200.

At step 1202, location data of a transit user is detected by the feedback system. The location data may include a plurality of locations of the transit user. In some embodiments, the location data is detected by a tracking device positioned within the transit system (e.g., within a transit station). In such embodiments, the tracking device may send the location data to a computer server.

At step 1204, an intent to validate is received by the feedback system from the transit user. The intent to validate may be sent using the transit user's portable electronic device. In some embodiments, the intent to validate is received by a validator positioned within the transit system (e.g., within the transit station). In such embodiments, the validator may send the intent to validate to the computer server.

At step 1206, the feedback system determines, based on the intent to validate, that a successful validation has occurred. In some embodiments, the validator determines that the successful validation has occurred. In such embodiments, the validator may send an indication of the successful validation to the computer server. In some embodiments, the computer server determines that the successful validation has occurred.

At step 1208, a location and a velocity of the transit user are determined by the feedback system based on the location data. In some embodiments, the feedback system first determines the plurality of locations based on the location data. In some embodiments, the tracking device determines the location and the velocity of the transit user based on the location data. In such embodiments, the tracking device sends the location and the velocity to the computer server. In some embodiments, the computer server determines the location and the velocity of the transit user based on the location data. In some embodiments, the location is either a current location or a projected location, and the velocity is either a current velocity or a projected velocity.

At step 1210, instructions for a feedback signal are generated by the feedback system based on the location and the velocity of the transit user. In some embodiments, the instructions are generated by the computer server. The instructions may include one or more of: a time for outputting the feedback signal, a duration for outputting the feedback signal, a position with respect to the transit user for outputting the feedback signal, a magnitude for the feedback signal, or a type of the feedback signal. In some embodiments, the feedback system may select a feedback device from a plurality of feedback devices based on the location of the transit user.

At step 1212, the feedback device is caused to output the feedback signal. The feedback signal may indicate the successful validation. In some embodiments, causing the feedback device to output the feedback signal includes sending, by the computer server via one of more communication interfaces, the instructions for the feedback signal to the feedback device. The feedback device may execute the instructions and output the feedback signal in accordance with the instructions. Upon perceiving the feedback signal, the transit user is provided with feedback regarding his/her attempt to validate.

Figure 13:
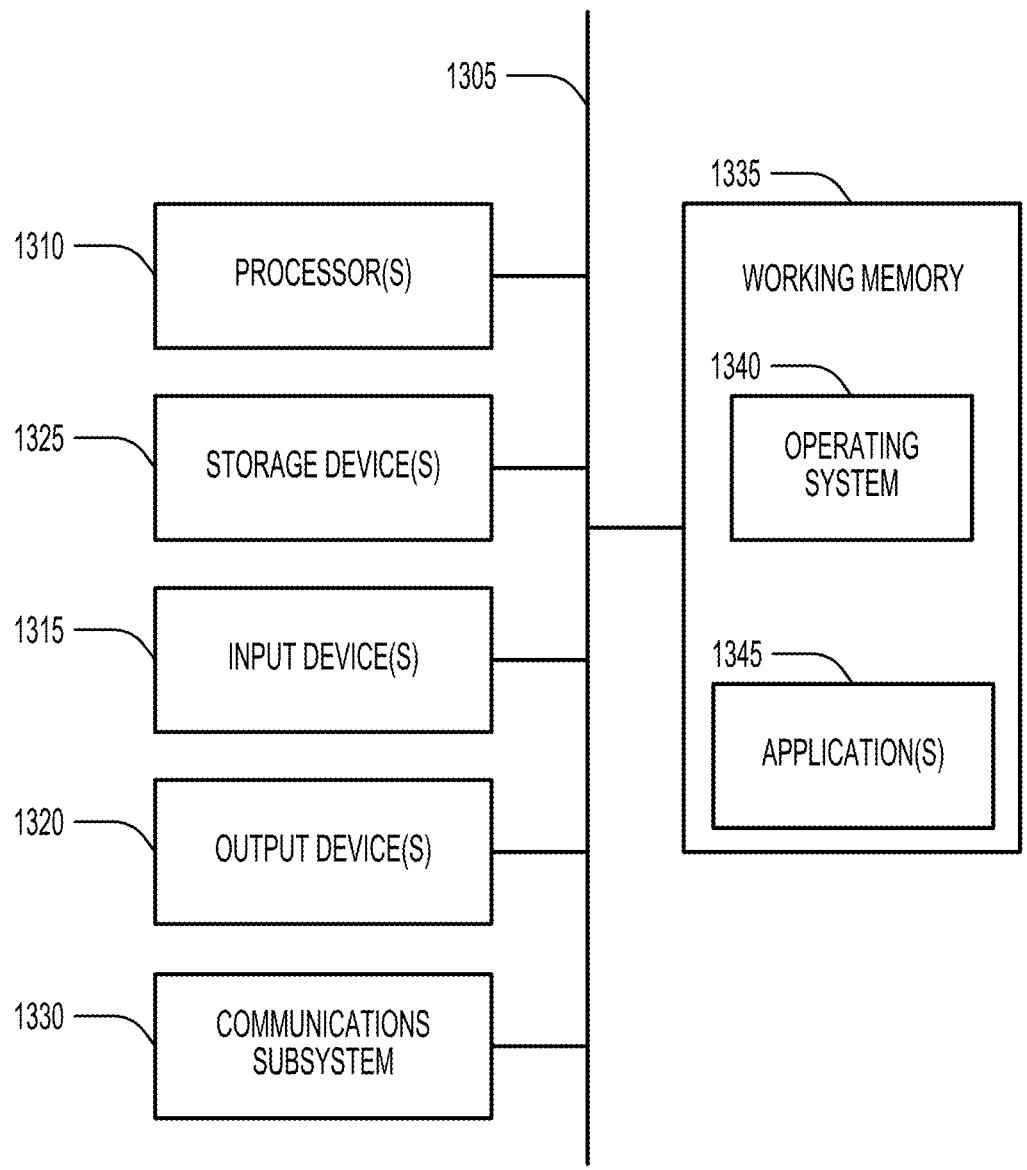
FIG. 13 illustrates a simplified computer system.

FIG. 13 illustrates a simplified computer system 1300, according to some embodiments of the present invention. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1330, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1330 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1330. In other embodiments, a portable electronic device, e.g. the first electronic device, may be incorporated into computer system 1300, e.g., an electronic device as an input device 1315. In some embodiments, computer system 1300 will further comprise a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 13, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1330 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A feedback system for providing dynamically responsive feedback to a transit user, the feedback system comprising:
  a feedback device positioned within a transit system and configured to output a feedback signal;
  a tracking device positioned within the transit system and configured to detect location data of the transit user within the transit system;
  a validator configured to:
    receive an intent to validate from the transit user, wherein the intent to validate corresponds to an intent to travel within the transit system;
    determine, based on the intent to validate, that a successful validation has occurred; and
    transmit an indication of the successful validation; and
  a computer server comprising:
    one or more communication interfaces;
    a memory; and
    a processing unit communicatively coupled with the communication interface and the memory and configured to perform operations comprising:
      receiving, via one of the one or more communication interfaces, the location data from the tracking device;
      receiving, via one of the one or more communication interfaces, the indication of the successful validation;
      determining, based on the location data, a location and a velocity of the transit user;
      generating instructions for the feedback signal based on the location and the velocity; and
      causing the feedback device to output the feedback signal at a particular distance from the location, wherein the particular distance is calculated as a function of the velocity, and wherein the feedback signal indicates the successful validation.

2. The feedback system of claim 1, wherein a duration for outputting the feedback signal is velocity dependent.

3. The feedback system of claim 1, wherein the operations further comprise:
  in response to determining the location and the velocity, selecting the feedback device of a plurality of feedback devices based on the location and the velocity.

4. The feedback system of claim 1, wherein:
  the location is either a current location or a projected location; and
  the velocity is either a current velocity or a projected velocity.

5. The feedback system of claim 1, wherein causing the feedback device to output the feedback signal includes sending, via one of the one or more communication interfaces, the instructions for the feedback signal to the feedback device.

6. The feedback system of claim 1, wherein the feedback device is a speaker and the feedback signal is an audio feedback signal.

7. The feedback system of claim 1, wherein the feedback device is a light source and the feedback signal is a visual feedback signal.

8. A method for providing dynamically responsive feedback to a transit user, the method comprising:
  detecting location data of the transit user within a transit system;
  receiving an intent to validate from the transit user, wherein the intent to validate corresponds to an intent to travel within the transit system;
  determining, based on the intent to validate, that a successful validation has occurred;
  determining, based on the location data, a location and a velocity of the transit user;
  generating instructions for a feedback signal based on the location and the velocity; and
  causing a feedback device positioned within the transit system to output the feedback signal at a particular distance from the location, wherein the particular distance is calculated as a function of the velocity, and wherein the feedback signal indicating the successful validation.

9. The method of claim 8, wherein:
  a duration for outputting the feedback signal is velocity dependent.

10. The method of claim 8, further comprising:
  in response to determining the location and the velocity, selecting the feedback device of a plurality of feedback devices based on the location and the velocity.

11. The method of claim 8, wherein:
  the location is either a current location or a projected location; and
  the velocity is either a current velocity or a projected velocity.

12. The method of claim 8, wherein causing the feedback device to output the feedback signal includes sending, via one or more communication interfaces, the instructions for the feedback signal to the feedback device.

13. The method of claim 8, wherein the feedback device is a speaker and the feedback signal is an audio feedback signal.

14. The method of claim 8, wherein the feedback device is a light source and the feedback signal is a visual feedback signal.

15. A non-transitory computer-readable medium comprising instructions that, when executed by a processor, cause the processor to perform operations comprising:
  detecting location data of a transit user within a transit system;
  receiving an intent to validate from the transit user, wherein the intent to validate corresponds to an intent to travel within the transit system;
  determining, based on the intent to validate, that a successful validation has occurred;
  determining, based on the location data, a location and a velocity of the transit user;
  generating instructions for a feedback signal based on the location and the velocity; and
  causing a feedback device positioned within the transit system to output the feedback signal at a particular distance from the location, wherein the particular distance is calculated as a function of the velocity, and wherein the feedback signal indicating the successful validation.

16. The non-transitory computer-readable medium of claim 15, wherein:
  a duration for outputting the feedback signal is velocity dependent.

17. The non-transitory computer-readable medium of claim 15, wherein the operations comprise:

in response to determining the location and the velocity, selecting the feedback device of a plurality of feedback devices based on the location and the velocity.

18. The non-transitory computer-readable medium of claim 15, wherein:
   the location is either a current location or a projected location; and
   the velocity is either a current velocity or a projected velocity.

19. The non-transitory computer-readable medium of claim 15, wherein causing the feedback device to output the feedback signal includes sending, via one or more communication interfaces, the instructions for the feedback signal to the feedback device.

20. The non-transitory computer-readable medium of claim 15, wherein the feedback device is a speaker and the feedback signal is an audio feedback signal.

* * * * *